Dec. 20, 1960         J. B. GARDNER         2,965,688
COOLING SELECTIVE ACETYLENE SOLVENT BY HEAT
EXCHANGE WITH VAPORIZING LIQUID METHANE
Filed Feb. 7, 1958
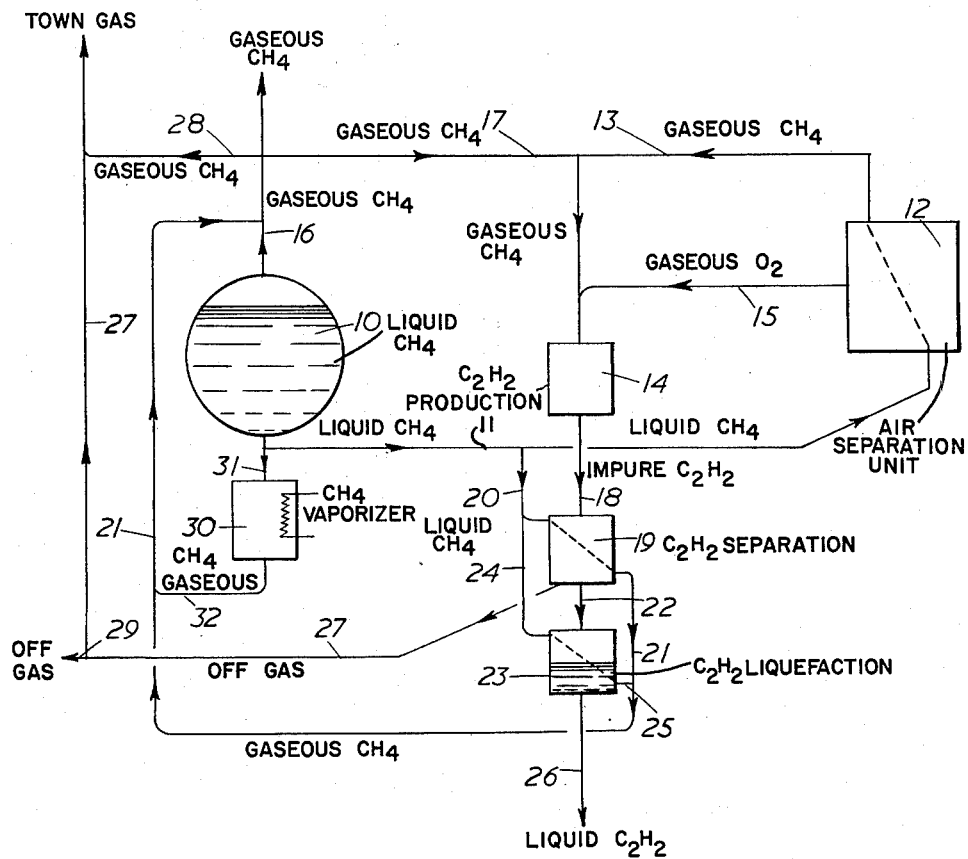
*Inventor*
JOHN BAXTER GARDNER
By
*Aaron R. Townshend* Attorney

United States Patent Office 2,965,688
Patented Dec. 20, 1960

2,965,688

COOLING SELECTIVE ACETYLENE SOLVENT BY HEAT EXCHANGE WITH VAPORIZING LIQUID METHANE

John Baxter Gardner, Wimbledon, England, assignor to The British Oxygen Company Limited, a British company Filed Feb. 7, 1958, Ser. No. 713,836

Claims priority, application Great Britain Mar. 5, 1957

3 Claims. (Cl. 260—679)

This invention relates to acetylene and more particularly to the separation of acetylene from admixture with other gases, for example, from the gaseous products produced by the pyrolysis or partial combustion of methane.

It is well known that acetylene may be produced by the pyrolysis of methane or gases rich in methane or by the partial combustion of such gases with oxygen at high temperatures. The gaseous products of these reactions contain acetylene in admixture with other gases and it is necessary to separate the acetylene from the other products.

A known method of effecting such separation makes use of the selective solution of acetylene in a suitable solvent, such as, for example, acetone or dimethylformamide. Such separation can advantageously be carried out at reduced temperatures, for example, in the range −30° to −100° C. Owing to the greatly increased solubility of acetylene under these conditions, the volume of solvent used and the pressure at which the process is operated can be correspondingly reduced. To obtain the requisite reduced temperature, however, refrigeration is necessary, and when such refrigeration is produced by conventional means, the cost of providing it may offset the advantages of operating at reduced temperature.

According to the present invention, in the separation of acetylene from admixture with other gases by absorption in a selective solvent for acetylene at a temperature substantially below 0° C., the refrigeration required to cool the solvent to and maintain it at the absorption temperature is derived from liquid methane or liquefied natural gas.

In the use of liquid methane or of liquefied natural gas, which is rich in methane, it is in general necessary that the liquefied gas should be vaporized and superheated to at least ambient temperature before functioning as a fuel, as a component for chemical reactions, or in most other possible applications. Such vaporization and superheating can be carried out by conventional methods, for example, by using heat obtained from steam, from electrical power, or from other such sources, but a considerable expenditure of energy is involved in carrying out the vaporization and superheating by such methods.

On the other hand, the refrigeration which is stored in a body of liquid methane or liquefied natural gas and which is potentially made available for use by the evaporation and superheating of such liquid, is thermodynamically equivalent to a large quantity of work.

In operating in accordance with the present invention, the refrigeration stored in the liquid methane or liquefied natural gas is advantageously employed in cooling the acetylene solvent whilst heat withdrawn in cooling the solvent serves to vaporize liquid methane or liquefied natural gas and also to superheat the gas produced, thus reducing or eliminating expenditure of electrical or other energy for the vaporization.

The gaseous methane or natural gas which is produced by the process of the present invention may be used for any purpose, for example, as a fuel, but in accordance with another feature of the present invention, at least a part of it is subjected to pyrolysis or partial combustion with oxygen to produce a gas mixture containing acetylene, which is subsequently separated by the process of the present invention.

Where the acetylene is produced by the partial combustion of methane with oxygen, the oxygen supply may be obtained from high pressure storage cylinders, by the vaporization of liquid oxygen, or by any other known method. Preferably, however, the oxygen is produced in an air separation unit for which at least a part of the refrigeration required to overcome heat in leaks, heat exchanger losses and the like, is supplied from a body of liquid methane or liquefied natural gas, part of which is simultaneously vaporized. Because of the hazards involved in bringing methane or a gas rich in methane into close proximity to air, the heat is preferably transported from the air separation unit to the liquid methane or liquefied natural gas through the agency of an inert heat exchange medium, such as a body of argon or nitrogen or a mixture of these, as described in our co-pending application No. 24,181/56, now British Patent No. 804,944, in which a suitable form of air separation unit and heat exchange equipment is also described.

For some purposes, it may be advantageous to produce acetylene in the form of liquid, or as a highly concentrated solution in a solvent at a low temperature. In such a case, the required refrigeration may be supplied from a body of liquid methane or liquefied natural gas, part of which will be simultaneously vaporized in the operation.

One embodiment of the invention will now be more particularly described with reference to the drawing which shows a flow sheet for the production of liquid acetylene from liquid methane or liquefied natural gas by partial combustion with oxygen.

Referring to the drawing, liquid methane or liquefied natural gas from a storage vessel 10 passes through a conduit 11 to an air separation unit 12 to which it supplies the necessary refrigeration and is itself vaporized and superheated to ambient temperature, as described in my co-pending application No. 24,181/56. From the air separation unit 12, the vaporized methane or natural gas passes through conduit 13 to a reaction chamber 14 after admixture with gaseous oxygen leaving the air separation unit 12 through conduit 15.

The storage vessel 10 is provided with a main gas exhaust conduit 16, and, if desired, additional vaporized methane or natural gas may be withdrawn from the conduit 16 through a conduit 17 which joins the conduit 13 at a point upstream of its junction with the conduit 15.

The reaction chamber 14 may be of any suitable form for the conversion of methane to acetylene by reaction with oxygen. The reaction may be effected at elevated temperatures or pressures or both and if desired in the presence of a catalyst. A typical composition of the product gas is:

| | Percent |
|---|---|
| $C_2H_2$ | 7.8 |
| $H_2$ | 52 |
| $O_2$ | 0.4 |
| $C_2H_4$ | 0.3 |
| $CH_4$ | 5.5 |
| $N_2$ | 2.1 |
| $CO_2$ | 30.9 |

The reaction gas from the chamber 14 passes through a conduit 18 to the acetylene absorber and separator 19, in which the acetylene is substantially completely separated from the other products by differential solution in a selective solvent for acetylene, such as acetone or dimethylformamide, at a reduced temperature, for example at a temperature within the range —30° to —100° C. All refrigeration requirements for this process, including, for example, the removal of the heat of solution of the acetylene at the reduced temperature, are supplied by the vaporization and superheating to ambient temperature of liquid methane or liquefied natural gas which is supplied to the separator 19 from the conduit 11 through a branch conduit 20. The vaporized and superheated methane or natural gas leaves the separator 19 through conduit 21 which joins the main exhaust conduit 16.

The gaseous acetylene from the separator 19 may be taken by way of a conduit 22 to a liquefier 23 in which the acetylene is converted to the liquid form or to a concentrated solution on a cold solvent by heat exchange with liquid methane or liquefied natural gas which is fed to the liquefier 23 from the conduit 20 via a conduit 24 and is itself vaporized in the process. The vaporized methane or natural gas so produced leaves the liquefier 23 through a conduit 25 which joins the conduit 21. The acetylene is withdrawn through a conduit 26.

The residual or "off" gas after removal of the acetylene is withdrawn from the separator 19 through conduit 27. This off gas will have a calorific value of the order of 375 B.t.u./cu. ft. Vaporized methane or natural gas, on the other hand, has a calorific value of about 910 B.t.u./cu. ft. The off gas may therefore be mixed with vaporized methane or natural gas withdrawn from the main exhaust conduit 16 through a branch conduit 28 in suitable proportions to give a mixed gas having a calorific value of approximately 500 B.t.u./cu. ft., which will be suitable for use as town gas or for supplementing a supply of the latter produced by conventional methods.

Alternatively, the off-gas may be withdrawn from conduit 27 through a conduit 29 for use, after suitable treatment and purification, as a component for the synthesis of ammonia.

If, depending upon the particular conditions employed, the requirement for gaseous methane or natural gas for the process exceeds the amount produced by vaporization of the liquefied gas in the process, it may be necessary to vaporize additional liquid. For this purpose, a vaporizer 30 is included, to which liquid methane or liquefied natural gas may be fed from conduit 11 through a branch conduit 31. The vaporized gas is fed to the main exhaust conduit 16 through a conduit 32.

If gaseous methane or natural gas is produced additional to that required for the process requirements, this may be used to supplement town gas, or for other purposes.

I claim:

1. A process for the preparation of acetylene comprising the steps of cooling a selective solvent for acetylene to and maintaining it at a temperature between —30° C. and —100° C. by heat exchange with liquid methane, whereby the liquid methane is itself vaporized, subjecting at least a part of said vaporized methane to thermal decomposition to produce a gas mixture containing acetylene, contacting said gas mixture containing acetylene with said cooled solvent, whereby acetylene is selectively absorbed from said gas mixture, and releasing absorbed acetylene from said solvent.

2. A process for the preparation of acetylene comprising the steps of cooling a selective solvent for acetylene to and maintaining at a temperature between —30° C. and —100° C. by heat exchange with liquid methane, whereby the liquid methane is itself vaporized, subjecting at least a part of said vaporized methane to partial combustion with oxygen to produce a gas mixture containing acetylene, contacting said gas mixture containing acetylene with said cooled solvent, whereby acetylene is selectively absorbed from said gas mixture, and releasing absorbed acetylene from said solvent.

3. A process according to claim 2 wherein the oxygen used for the partial combustion of said vaporized methane is derived from the separation of air, at least a part of the refrigeration necessary for such separation being derived from the vaporization of said liquid methane.

References Cited in the file of this patent
UNITED STATES PATENTS

| | | |
|---|---|---|
| 2,241,430 | Snow | May 13, 1941 |
| 2,799,997 | Morrison | July 23, 1957 |
| 2,830,677 | Coberly | Apr. 15, 1958 |